United States Patent Office 3,008,872
Patented Nov. 14, 1961

3,008,872
BINARY AND TERNARY INSECT
REPELLENT COMPOSITIONS
Lyle D. Goodhue and Kenneth E. Cantrel, Bartlesville,
Okla., assignors to Phillips Petroleum Company, a corporation of Delaware
No Drawing. Filed Oct. 3, 1955, Ser. No. 538,269
8 Claims. (Cl. 167—33)

This invention relates to insect repellent compositions. In one of its aspects, the invention relates to fly repellent compositions having an improved period of effectiveness comprising a butadiene-furfural aldehyde or alcohol in admixture with a compound which can be selected from the group of the diethyl, di-n-propyl, and di-n-butyl esters of pyridine-2,5-dicarboxylic acid and having a longer effective repellent life than either of the binary constituents have when used alone. In another of its aspects, the invention relates to compositions having even a longer effective repellent life comprising the aforesaid compositions in further composition with an N-alkyl imide of bicyclo-[2.2.1]-5-heptene-2,3-dicarboxylic acid in which the alkyl group contains 1–12 carbon atoms.

The control of stable flies is a particularly important problem on farms and ranches. The stable fly, *Stomoxys calcitrans* (Linn.) is a bad pest of domestic animals, particularly of cattle and horses. The stable flies have long, piercing mouth parts which they use to penetrate the skin of the animal and thus feed on the animal. They worry the animals continuously, and weaken them by sucking their blood. The resulting economic loss due to stable flies is especially noticeable in the case of dairy cows, as milk production diminishes markedly when the cows are bothered by large numbers of stable flies. An effective stable fly repellent would be a boon to the farmer as it would increase the production of milk and beef and improve the general state of health of his animals.

It is an object of this invention to produce insect repellent compositions having a longer effective life than any of the effective insecticidal ingredients therein contained. It is another object of this invention to produce a stable fly repellent composition which has a longer effective life than any of its effective stable fly repellent ingredients. Other aspects, objects, and several advantages of the invention are apparent from this disclosure and the appended claims.

It is disclosed in pending application Ser. No. 399,615, filed December 21, 1953, now U.S. Patent 2,795,576, referred to again herein, that 2,3,4,5-bis(Δ²-butenylene)-tetrahydrofurfuryl alcohol, 2,3,4,5-bis(butylene)tetrahydrofurfural and derivatives of these compounds are effective as insect repellents. It is also disclosed in pending application Ser. No. 240,602, filed August 6, 1951, now U.S. Patent 2,757,120, also referred to again herein, that the diethyl, di-n-propyl, and di-n-butyl esters of pyridine dicarboxylic acids are effective insect repellents.

It has now been discovered that a mixture of a 2,3,4,5-bis(Δ²-butenylene)tetrahydrofurfural, a 2,3,4,5 - bis(Δ²-butenylene)tetrahydrofurfuryl alcohol, a 2,3,4,5-bis-(butylene)tetrahydrofurfural, or a 2,3,4,5-bis(butylene)-tetrahydrofurfuryl alcohol with at least one of the compounds selected from the group of the di-n-propyl, diethyl and di-n-butyl esters of pyridine-2,5-dicarboxylic acid has a longer period of effectiveness for repelling stable flies than either of the individual constituents has when equivalent amounts of active repellent material are employed.

It has also been discovered that a mixture as described in the preceding paragraph can have incorporated therewith an N-alkyl imide of bicyclo-[2.2.1]-5-heptene-2,3-dicarboxylic acid in which the alkyl group contains 1–12 carbon atoms inclusive.

Therefore, according to this invention, there are provided a method and a composition for repelling insects such as stable flies, the said method comprising applying to the situs from which the insects are to be repelled a composition which comprises a mixture of at least one of a 2,3,4,5-bis(Δ²-butenylene)tetrahydrofurfural, a 2,3,4,5-bis(Δ²-butenylene)tetrahydrofurfuryl alcohol, a 2,3,4,5-bis(butylene)tetrahydrofurfural, and a 2,3,4,5-bis(butylene)tetrahydrofurfuryl alcohol with at least one compound selected from the group of the di-n-alkyl esters of pyridine-2,5-dicarboxylic acid in which any alkyl group contains 2–4 carbon atoms.

Further, according to this invention, it has been found advantageous, at least in some instances, to modify the insect repellent compositions set forth in the preceding paragraph by incorporating thereinto an N-alkyl imide of bicyclo-[2.2.1]-5-heptene-2,3-dicarboxylic acid in which the alkyl group contains 1–12 carbon atoms inclusive.

The 2,3,4,5 - bis(Δ²-butenylene)tetrahydrofurfuryl alcohols, 2,3,4,5 - bis(butylene)tetrahydrofurfurals, and derivatives of these compounds, from which a compound can be selected as at least one of the constituents of the binary synergistic stable fly repellents of this invention, are best represented by the following general formulas.

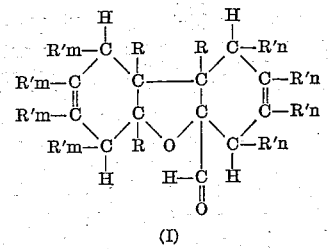

(I)

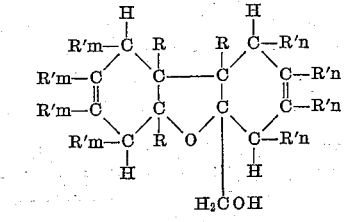

(II)

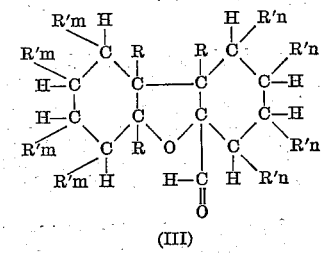

(III)

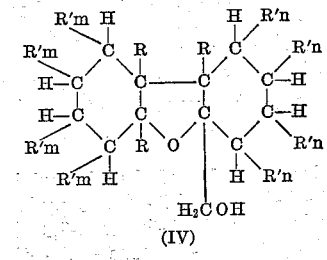

(IV)

in which each R is a radical selected from the group consisting of hydrogen and methyl, at least one R is hydrogen, each R' is a radical selected from the group of hydrogen and an alkyl group having not more than three carbon atoms and in which the sum of the carbon atoms in the R'm and R'n radicals is in each case not greater than three and at least two of the R'm and at least two of the R'n radicals are hydrogen.

As specific constituents of the binary synergistic stable fly repellent material any one of the diethyl, di-n-propyl, and di-n-butyl esters of pyridine-2,5-dicarboxylic acid can be used.

The binary synergistic repellent compositions of this invention usually will contain an amount in the range of 35 percent to 90 percent by weight of the constituent or constituents selected from the group of 2,3,4,5-bis-($\Delta^2$-butenylene)tetrahydrofurfural, 2,3,4,5 - bis($\Delta^2$-butenylene)-furfuryl alcohol, 2,3,4,5-bis(butylene)tetrahydrofurfural, 2,3,4,5-bis(butylene)tetrahydrofurfuryl alcohols, and the above denoted derivatives of these compounds.

The binary synergistic repellent compositions of this invention are especially effective when applied to a surface from which stable flies are to be repelled in an amount in the range between 0.5 and 100 per 100 square feet.

The repellent compositions of this invention can be applied for their intended purpose as solutions, emulsions, aerosols, fog, dusts, as concentrates in which they are prepared, or as wettable powders. A preferred method of application is to spray a liquid composition onto a surface from which stable flies are to be repelled, i.e., spray the repellents dissolved in a solvent. Each of the ingredients of the composition to be applied can be applied to the area or surface separately.

Solvents or carriers which are applicable include those which have no detrimental effect on the active repellent ingredients, and which, when the repellent composition is applied to livestock is substantially non-irritating and non-toxic to the animal. Examples of suitable solvents and carrier materials are petrolatum, deodorized kerosene, the isoparaffinic hydrocarbon, boiling in the range of 300–800° F. prepared by the alkylation of paraffins with olefins using catalysts such as hydrofluoric acid, sulfuric acid, aluminum trichloride, and the like, and other liquid purified hydrocarbons. Solid carriers such as talc, kieselguhr, and other inert carriers may be employed when these repellents are to be applied as dust. If aqueous emulsions of the repellents are used, suitable emulsifying agents such as alkylated aryl polyether alcohols and the like may be employed.

While the synergistic effect of the constituents of the binary repellent compositions of this invention on each other is most apparent when these materials are employed as repellents for stable flies, these repellent compositions are also highly effective as repellents for house flies and horn flies.

N-alkyl imides of bicyclo-[2.2.1]-5-heptane-2,3-dicarboxylic acid in which the alkyl group contains from 1–12 carbon atoms inclusive can be advantageously incorporated into the binary repellent mixtures of this invention to reduce the total amount of active binary repellent material necessary to obtain the same period of effective repellent life.

The amount of an N-alkyl imide of bicyclo-[2.2.1]-5-heptene-2,3-dicarboxylic acid as defined above which can be admixed with these binary repellent compositions can vary and usually will be in the range between 30 and 70% by weight based on the total resulting mixture, the other two components, the binary repellent combinations listed above, being maintained in the aforementioned proportions.

Representative examples of the N-alkyl imides of bicyclo - [2.2.1] - 5 - heptene-2,3 - dicarboxylic acid include N-methyl bicyclo - [2.2.1] - 5 - heptene-2,3-dicarboximide; N-ethyl bicyclo-[2.2.1]-5 - heptene - 2,3 - dicarboximide; N-isopropyl bicyclo-[2.2.1]-5-heptene-2,3-dicarboximide; N-2-ethylhexyl bicyclo - [2.2.1] - 5 - heptene-2,3-dicarboximide; N-t-dodecyl bicyclo[2.2.1]-5-heptene-2,3-dicarboximide; N-isoheptyl bicyclo-[2.2.1]-5-heptene-2,3-dicarboximide; N-t-butyl bicyclo-[2.2.1]-5-heptene-2,3-dicarboximide; N-3-propyloctyl bicyclo-[2.2.1]-5-heptene-2,3-dicarboximide; and N-2,3-dimethyldecyl bicyclo-[2.2.1]-5-heptene-2,3-dicarboximide.

Of the above listed compounds, the preferred compound is N-2-ethyl-hexyl imide of bicyclo-[2.2.1]-5-heptene-2,3-dicarboxylic acid.

EXAMPLE

Organdy bags, fabricated from a sheet of organdy 10 inches square so that one end of the bag is open, were impregnated with the desired amount of repellent dissolved in 6 to 7 milliliters of acetone and were then suspended on a line to dry. After 24 hours, the bags were drawn over the hand and exposed to several thousand hungry stable flies *Stomoxy calcitrans* (Linn.) confined in 30-inch cubical cages. The flies were reared according to the method reported by Campau, Baker, and Morrison, J. Econ. Entomology 46, 524, (1953). The time to the first bite was recorded. If no bites were sustained in five minutes, the bag was withdrawn and the procedure repeated the following day. The period of effective repellency was recorded as the number of days from the day the bags were impregnated to the day when the first bite was sustained. The results of these tests are expressed below as Table I. Data are also given in this table for the period of effective repellency for the individual constituents of the binary repellent compositions.

Table I

| Compound [1] | Grams per Bag | Period of Effective Repellency (Days) |
|---|---|---|
| 1 | 2.0 | 4 |
| 3 | 2.0 | [2] 1 |
| 2 | 2.0 | [3] 9 |
| 2 | 1.0 | 3 |
| 3 | 2.0 | 3 |
| 3 | 1.0 | 2 |
| 1 | 1.0 | 7 |
| 2 | 1.0 | |
| 3 | 1.0 | 13 |
| 3 | 1.0 | |
| 2 | 0.5 | 9 |
| 3 | 1.5 | |
| 2 | 1.5 | 13 |
| 3 | 0.5 | |
| 2 | 0.5 | 9 |
| 3 | 0.5 | |
| 1 | 0.5 | 8 |
| 3 | 0.5 | |
| 4 | 1.0 | |
| 2 | 0.5 | 13 |
| 3 | 0.5 | |
| 4 | 1.0 | |

[1] Compound #1—2,3,4,5-bis($\Delta^2$-butenylene)tetrahydrofurfural; compound #2—2,3,4,5-bis($\Delta^2$-butenylene)tetrahydrofurfuryl alcohol; compound #3—di-n-propyl ester of pyridine-2,5-dicarboxylic acid; compound #4—N-2-ethylhexyl imide of bicyclo-[2.2.1]-5-heptene-2,3-dicarboxylic acid.

[2] This control run was run at the same time as the control for compound #1 and the binary combination of compounds #1 and 3. The other control runs for compound #3 were run at the same time as the runs for compounds #2 and 3 binary compositions. These two different sets of control data for compound #3 were thus run at different times using different colonies of flies.

[3] This was unusually high due to the depleted condition of the fly colony; period of effectiveness usually about 7 days for this compound at this rate.

From the preceding example it can be seen that the following ratios of compositions are used: a ratio of 1:3 to 3:1 of 2,3,4,5-bis($\Delta^2$-butenylene)tetrahydrofurfuryl alcohol to di-n-propyl ester of pyridine-2,5-dicarboxylic acid is used; a ratio of 1:1 of 2,3,4,5-bis($\Delta^2$-butenylene)tetrahydrofurfural to di-n-propyl ester of pyridine-2,5-dicarboxylic acid is used; a ratio of 1:1:2 of either 2,3,4,5-bis($\Delta^2$-butenylene)tetrahydrofurfural or 2,3,4,5 - bis($\Delta^2$-butenylene)tetrahydrofurfuryl to di-n-propyl ester of pyridine-2,5-dicarboxylic acid to N-2-ethylhexyl imide of bicyclo-[2.2.1]-5-heptene-2,3-dicarboxylic acid is used.

Patent 2,687,419, of August 24, 1954, John C. Hillyer, discloses and claims a polycyclic alcohol having as characteristic structure that of Formula II given herein.

Patent 2,683,151 of July 6, 1954, John C. Hillyer and

Daniel Nicewander discloses and claims an aldehyde having as characteristic structure that of Formula I given herein.

Application for patent, Serial No. 396,321, filed December 4, 1953, now U.S. Patent 2,795,592, by John C. Hillyer discloses and claims certain polycyclic compounds which include compounds having as characteristic structure that of Formulas III and IV given herein.

Application Serial No. 240,602, filed August 6, 1951, now U.S. Patent 2,757,120, discloses and claims an insect repellent composition comprising at least one of the compounds which follow: diethyl ester of pyridine dicarboxylic acid, di-n-propyl ester of pyridine dicarboxylic acid, and di-n-butyl ester of pyridine dicarboxylic acid.

Application for patent, Serial No. 399,615, filed December 21, 1953, now U.S. Patent 2,795,526, discloses and claims insect repellent compositions comprising at least one of the compounds of Formulas II, III, and IV given herein.

Patent 2,572,577 of October 23, 1951, to Carolyn E. Tissol and Lyle D. Goodhue, discloses and claims an insect repellent method employing a compound having as a characteristic structure that of Formula I given herein.

Application for patent, Serial No. 467,882, filed November 9, 1954, now U.S. Patent 2,919,227, by Lyle D. Goodhue and Kenneth E. Cantrel, discloses and claims an insect repellent composition comprising at least one compound having as its characteristic structure that of Formulas I–IV given herein and at least one imide of the class of N-alkyl imides of bicyclo-[2.2.1]-5-heptane-2,3-dicarboxylic acid.

Application for patent, Serial No. 453,122 filed August 30, 1954, now U.S. Patent 2,884,355, by Lyle D. Goodhue and Kenneth E. Cantrel, discloses and claims certain improved repellent compositions including compositions comprising at least one of diethyl-di-n-propyl, and di-n-butyl pyridine carboxylates and an N-alkyl imide of bicyclo-[2.2.1]-5-heptene-2,3-dicarboxylic acid wherein the alkyl group does not contain more than 12 carbon atoms.

Patent 2,610,116 of September 9, 1952, Lyle D. Goodhue and Carolyn E. Tissol, discloses and claims a herbicidal composition comprising 2,3,4,5-bis-($\Delta^2$-butenylene) tetrafurfural. Similarly, such a composition comprising 2,3,4,5-bis($\Delta^2$-butenylene)tetrahydrofurfural is disclosed and claimed. Generally, the said patent discloses and claims a method of killing plants employing a compound having the structural characteristics of Formula I hereof wherein R is selected from the group consisting of hydrogen and methyl, R'm is selected from the group consisting of hydrogen, methyl and chloro, R'n is selected from the group consisting of hydrogen, methyl and chloro, at least one R is hydrogen, at least two R'm's are hydrogen, at least two R'n's are hydrogen, not more than one R'm is chloro, not more than one R'n is chloro, and wherein in lieu of the hydrogen of the aldehyde group, there can be a —OH and —OM group wherein M is an alkali metal; and chlorinated derivatives of such compounds containing not over 52 weight percent total chlorine.

Also disclosed and claimed in the said patent are methods for inhibiting and defoliating plants with such compounds.

Reasonable variation and modification are possible within the scope of the foregoing disclosure and the appended claims to the invention, the essence of which is: a composition repellent to insects has been provided comprising two essential ingredients, at least one of which is selected from the compounds for which formulas are given herein and identified as Formulas I, II, III, and IV, and at least one of a di-n-alkyl ester of pyridine-2,5-dicarboxylic acid in which any alkyl group contains 2-4 carbon atoms; and, further, that the said composition can further comprise in any desired instance an N-alkyl imide of bicyclo-[2.2.1]-5-heptene-2,3-dicarboxylic acid in which the alkyl group contains 1-12 carbon atoms inclusive; and, still further, that a method for repelling insects, especially stable flies, house flies, horn flies, and the like have been set forth.

We claim:
1. A binary synergistic insect repellent composition, especially adapted for repelling stable flies, comprising as active essential ingredients 2,3,4,5-bis($\Delta^2$-butenylene) tetrahydrofurfural in admixture with synergistic proportions of di-n-propyl ester of pyridine-2,5-dicarboxylic acid dissolved in an organic solvent which boils above atmospheric temperature, in a concentration sufficient upon application to deposit about 36 grams of 2,3,4,5-bis($\Delta^2$-butenylene)tetrahydrofurfural and about 36 grams of di-n-propyl ester of pyridine-2,5-dicarboxylic acid per 100 square feet of exposed surface.

2. A binary synergistic insect repellent composition, especially adapted for repelling stable flies, comprising as active essential ingredients 2,3,4,5-bis($\Delta^2$-butenylene)-tetrahydrofurfuryl alcohol in admixture with synergistic proportions of di-n-propyl ester of pyridine-2,5-dicarboxylic acid dissolved in an organic solvent which boils above atmospheric temperature, and the ratio of said alcohol to said ester in said admixture ranging from 1:3 3:1, in a concentration sufficient upon application to deposit from about 18 to about 54 grams of 2,3,4,5-bis($\Delta^2$-butenylene)tetrahydrofurfuryl alcohol and from about 18 to about 54 grams of di-n-propyl ester of pyridine-2,5-dicarboxylic acid per 100 square feet of exposed surface, and the total amount of said active ingredients deposited ranging from about 36 to about 72 grams per 100 square feet of exposed surface.

3. A ternary synergistic insect repellent composition, especially adapted for repelling stable flies, comprising as active essential ingredients 2,3,4,5-bis($\Delta^2$-butenylene)-tetrahydrofurfural in admixture with synergistic proportions of di-n-propyl ester of pyridine-2,5-dicarboxylic acid and N-2-ethylhexyl imide of bicyclo[2.2.1]-5-heptene-2,3-dicarboxylic acid dissolved in an organic solvent which boils above atmospheric temperature, in a concentration sufficient upon application to deposit about 18 grams of 2,3,4,5-bis($\Delta^2$-butenylene)tetrahydrofurfural, about 18 grams of di-n-propyl ester of pyridine-2,5-dicarboxylic acid and about 36 grams of N-2-ethylhexyl imide of bicyclo[2.2.1]-5-heptene - 2,3 - dicarboxylic acid per 100 square feet of exposed surface.

4. A ternary synergistic insect repellent composition, especially adapted for repelling stable flies, comprising as active essential ingredients 2,3,4,5-bis($\Delta^2$-butenylene)-tetrahydrofurfuryl alcohol in admixture with synergistic proportions of di-n-propyl ester of pyridine-2,5-dicarboxylic acid and N-2-ethylhexyl imide of bicyclo[2.2.1]-5-heptene-2,3-dicarboxylic acid dissolved in an organic solvent which boils above atmospheric temperature, in a concentration sufficient upon application to deposit about 18 grams of said alcohol, about 18 grams of said di-n-propyl ester, and about 36 grams of said N-2-ethylhexyl imide per 100 square feet of exposed surface.

5. A binary synergistic insect repellent composition, especially adapted for repelling stable flies, comprising 2,3,4,5-bis($\Delta^2$-butenylene)tetrahydrofurfural in admixture with a compound selected from the group consisting of diethyl-, di-n-propyl-, and di-n-butyl esters of pyridine-2,5-dicarboxylic acid in a proportion of 1:1.

6. A binary synergistic insect repellent composition, especially adapted for repelling stable flies, comprising 2,3,4,5-bis($\Delta^2$-butenylene)tetrahydrofurfuryl alcohol in admixture with synergistic proportions of a compound selected from the group consisting of diethyl-, di-n-propyl- and di-n-butyl esters of pyridine-2,5-dicarboxylic acid, said proportions being in the range 1:3–3:1 of said ester to said alcohol.

7. A ternary synergistic insect repellent composition, comprising 2,3,4,5-bis($\Delta^2$-butenylene)tetrahydrofurfural in admixture with a compound selected from the group consisting of diethyl-, di-n-propyl-, and di-n-butyl esters of pyridine-2,5-dicarboxylic acid and N-2-ethylhexyl imide of bicyclo[2.2.1]-5-heptene-2,3-dicarboxylic acid in a proportion of 1:1:2 of said tetrahydrofurfural to said ester to said imide.

8. A ternary synergistic insect repellent composition comprising 2,3,4,5-bis($\Delta^2$-butenylene)tetrahydrofurfuryl alcohol in admixture with a compound selected from the group consisting of di-n-propyl-, diethyl-, and di-n-butyl esters of pyridine-2,5-dicarboxylic acid and N-2-ethylhexyl imide of bicyclo-[2.2.1]-5-heptene-2,3-dicarboxylic acid in a proportion of 1:1:2 of said alcohol to said ester to said imide.

References Cited in the file of this patent

UNITED STATES PATENTS

| | | |
|---|---|---|
| 2,545,283 | Johnson | Mar. 13, 1951 |
| 2,572,577 | Tissal et al. | Oct. 23, 1951 |
| 2,687,419 | Hillyer et al. | Aug. 24, 1954 |
| 2,757,120 | Leonard | July 31, 1956 |
| 2,795,526 | Goodhue et al. | June 11, 1957 |
| 2,795,592 | Hillyer | June 11, 1957 |

OTHER REFERENCES

Hoffman: J. Ec. Ent. 47, page 72–76 (1954).

Perry et al.: J. Ec. Ent. 44, pages 839–850 (1951).

King: U.S. Dept. of Agriculture Handbook No. 69, pages 298 and 146–147, items. Nos. 9500–9502 and 4252–5256.

Synergism and Antagonism as Displayed by Certain Antibacterial Substances, the Lancet, vol. 259, pp. 46–50, July 1950.